United States Patent
Fath

[11] 3,872,187
[45] Mar. 18, 1975

[54] ARYLOXYALKYL HALOALKYL PHOSPHATES

[75] Inventor: Joseph Fath, Princeton, N.J.

[73] Assignee: Tenneco Chemicals, Inc., Saddle Brook, N.J.

[22] Filed: Jan. 21, 1974

[21] Appl. No.: 435,076

Related U.S. Application Data

[62] Division of Ser. No. 290,058, Sept. 18, 1972, abandoned.

[52] U.S. Cl. .............................. 260/951, 260/30.6 R
[51] Int. Cl. ................................................ C07f 9/08
[58] Field of Search ..................................... 260/951

[56] References Cited
UNITED STATES PATENTS
3,706,821  12/1972  Anderson et al. ................. 260/951

*Primary Examiner*—Lorraine A. Weinberger
*Assistant Examiner*—Richard L. Raymond
*Attorney, Agent, or Firm*—Evelyn Berlow

[57] ABSTRACT

Phosphate esters that have the structural formula

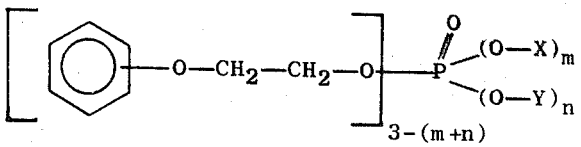

wherein X and Y each represents haloalkyl having 2 to 4 carbon atoms and at least 2 halogen atoms selected from the group consisting of bromine, chlorine, and mixtures thereof, and m and n each represents a number in the range of 0 to 2, the sum of m and n being 1 or 2, are used as flame-retardant plasticizers in vinyl halide resin compositions.

6 Claims, No Drawings

ARYLOXYALKYL HALOALKYL PHOSPHATES

This is a division of my copending application Serial No. 290,058, which was filed on September 18, 1972, now abandoned.

This invention relates to aryloxyalkyl haloalkyl phosphates and to the use of these compounds in flame-retardant resinous compositions.

There is a growing concern regarding the fire resistance of plastics and other materials that are used in private homes, public buildings, military and industrial applications, and public and private transportation. In many cases standards of flame-resistance have been established for these materials; in all probability more stringent standards will have to be met in the future.

Because of their high halogen content, vinyl halide resins are inherently non-burning. Rigid vinyl halide resin compositions, which contain little or no plasticizer, are usually self-extinguishing. The non-flammable properties of the vinyl halide resins are generally lost when 25% or more of flammable plasticizers and other modifying ingredients is incorporated into the resinous composition.

It has been proposed that various phosphate esters be used alone or in combination with other plasticizers to retain the flame-retarding properties of the plasticized vinyl halide resin compositions. The use of these esters has not proven to be entirely satisfactory, however, because the phosphate esters, which are relatively high in cost, often have a deleterious effect on the physical and mechanical properties of the compositions. For example, compositions that contain a triaryl phosphate, such as tricresyl phosphate and cresyl diphenyl phosphate, or an alkyl diaryl phosphate, such as 2-ethylhexyl diphenyl phosphate and isodecyl diphenyl phosphate, usually have unsatisfactory low temperature flexibility and heat and light stability, whereas compositions that contain trioctyl phosphate or other trialkyl phosphate often do not have good processing characteristics.

In accordance with this invention, it has been found that the incorporation into a vinyl halide resin composition of a flame-retardant plasticizer that comprises an aryloxyalkyl haloalkyl phosphate results in compositions that are characterized by excellent flame-retardance, excellent low temperature flexibility and mechanical properties, good heat and light stability, and other valuable properties. In addition these compositions are easier to process than those that contain the previously-known flame-retardant plasticizers.

The flame-retardant compositions of this invention are prepared by incorporating into a vinyl halide resin composition a flame-retarding amount of a phosphate ester that has the structural formula

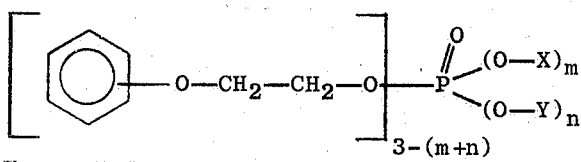

wherein X and Y each represents haloalkyl having 2 to 4 carbon atoms and at least 2 halogen atoms selected from the group consisting of chlorine, bromine, and mixtures thereof and m and n each represents a number in the range of 0 to 2, the sum of m and n being 1 or 2. Illustrative of these phosphate esters are phenoxyethyl bis(2,3-dibromopropyl) phosphate, bis(phenoxyethyl) (2,3-dibromopropyl) phosphate, phenoxyethyl bis(1,3-dichloropropyl) phosphate, bis(phenoxyethyl) (1,3-dichloropropyl) phosphate, phenoxyethyl bis(1-chloro-3-bromoisopropyl) phosphate, bis(phenoxyethyl) (1-chloro-3-bromoisopropyl) phosphate, phenoxyethyl bis(3,3-dibromopropyl) phosphate, bis(phenoxyethyl) (3,3-dibromopropyl) phosphate, bis(phenoxyethyl) (2,3-dichloropropyl) phosphate, phenoxy-ethyl bis(1,3-dibromopropyl) phosphate, and the like.

While the aryloxyalkyl haloalkyl phosphates may be used as the sole plasticizer in the vinyl halide resin compositions, they are ordinarily and preferably used in combination with at least oone of the conventional plasticizers that are well known in the prior art. A wide variety of monomeric and polymeric plasticizers can be used in combination with the aryloxyalkyl haloalkyl phosphates. Best results have been obtained using primary ester plasticizers that are the mono-, di-, and tri-esters produced by the reaction of a monohydric or dihydric alcohol having from 4 to 12 carbon atoms with phthalic anhydride, fatty acids, adipic acid, azelaic acid, sebacic acid, benzoic acid, citric acid, and other acids. Among the most useful of these primary ester plasticizers are dialkyl phthalates such as dibutyl phthalate, dihexyl phthalate, di-n-octyl phthalate, diisooctyl phthalate, di-2-ethylhexyl phthalate, dinonyl phthalate, didodecyl phthalate, and hexyl octyl phthalate, aryl alkyl phthalates such as butyl benzyl phthalate; dialkyl sebacates such as dibutyl sebacate and di-2-ethylhexyl sebacate; dialkyl adipates such as di-n-octyl adipate, diisooctyl adipate, and diisodecyl adipate; dialkyl azelates such as diisooctyl azelate; citrates such as acetyl tributyl citrate; alkyl phthalyl alkyl glycolates such as ethyl phthalyl ethyl glycolate and butyl phthalyl butyl glycolate; and glycol benzoates such as diethylene glycol dibenzoate and dipropylene glycol dibenzoate. It is particularly preferred that dioctyl phthalate be used as the primary ester plasticizer.

In addition to the arryloxyalkyl haloalkyl phosphate and the primary ester plasticizer, the vinyl halide resin compositions may contain minor amounts of other plasticizers, such as epoxidized esters and chlorinated paraffins.

To obtain plasticized compositions having desirable combinations of properties, about 0.1 part to about 10 parts by weight of the primary ester plasticizer is used per part by weight of the aryloxyalkyl haloalkyl phosphate. Most satisfactory results have been obtained when the plasticizer mixture contained 1 part to 5 parts of the primary ester plasticizer per part by weight of the aryloxyalkyl haloalkyl phosphate.

The amount of the plasticizer that comprises an aryloxyalkyl haloalkyl phosphate that will impart Flame-retardance, low temperature flexibility, and other valuable properties to the vinyl halide resin composition is in the range of about 5 parts to about 100 parts or more by weight per 100 parts by weight of the vinyl halide resin. In most cases an excellent combination of flame retardance and physical and mechanical properties is obtained when about 30 parts to about 60 parts by weight of the plasticizer is used per 100 parts by weight of the vinyl halide resin. In polyvinyl chloride compositions, the best results are obtained when 40 to 50 parts by weight of the plasticizer that comprises an aryloxyalkyl haloalkyl phosphate is used per 100 parts by weight of the resin.

The vinyl halide resins that may be present in the flame-retardant resinous compositions are the resinous products obtained by the polymerization of a vinyl halide in the presence or absence of a copolymerizable monomer. The term "vinyl halide resin" as used herein includes vinyl halide homopolymers, such as polyvinyl chloride, polyvinyl bromide, and polyvinylidene chloride, as well as vinyl halide copolymers, including those formed by the polymerization of a vinyl halide with a comonomer, for example, vinyl esters such as vinyl acetate, vinyl propionate, vinyl butyrate, and vinyl chloroacetate; vinylidene chloride; vinyl alkyl sulfonates; vinyl ethers such as vinyl ethyl ether, vinyl isopropyl ether, and vinyl chloroethyl ether; cyclic unsaturated compounds such as styrene, chlorostyrenes, coumarone, indene, vinylnaphtalenes, vinylpyridines, and vinylpyrrole; acrylid acid and its derivatives such as ethyl acrylate, methyl methacrylate, ethylmethacrylate, ethyl chloroacrylate, acrylonitrile, and methacrylonitrile; dialkyl fumarates and maleates; unsaturated hydrocarbons such as ethylene, propylene, and isobutene; allyl compounds such as allyl acetate, allyl chloride, and allyl ethyl ether; and conjugated and cross-conjugated ethylenically-unsaturated compounds such as butadiene, isoprene, chloroprene, and divinyl ketone; and mixtures thereof. The useful copolymers are those that contain at least 70% of vinyl halide units and up to 30% of comonomer units. The novel phosphate esters can also be used in mixtures of vinyl halide resins in a major proportion with a minor proportion of another synthetic resin, such as polyethylene; polypropylene; polyacrylate and polymethacrylate esters; synthetic rubber such as neoprene, silicone, nitrile, and SBR; polyurethanes; polyamides; polystyrene; phenolics; ureaformaldehydes; cellulose esters; epoxies; and silicones.

In addition to the vinyl halide resin and the plasticizer, the compositions may contain heat and light stabilizers, lubricants, pigments, dyes, extenders, solvents, optical brighteners, antioxidants, and other resin additives in the amounts ordinarily used for the purpose indicated.

The vinyl halide resin compositions may be prepared by any suitable and convenient procedure. For example, the vinyl halide resin can be blended with the plasticizer, stabilizers, and other additives, and the resulting mixture milled at from 300°F. to 400°F. on a two roll mill for a time sufficient to form a homogenous sheet. The composition can then be removed from the mill in the form of a sheet or film of the desired thickness, which may be used as such or subjected top a polishing or embossing treatment.

Each of the resinous compositions disclosed herein is flame-retardant, and each has a good combination of physical and mechanical properties. Compositions that are exceptionally valuable result when a plasticizer that contains 1 part to 5 parts by weight of dioctyl phthalate per part by weight of a phenoxyethyl dichloropropyl phosphate or a phenoxyethyl dibromopropyl phosphate is incorporated into a polyvinyl chloride composition in the amount of 40 parts to 50 parts by weight of the plasticizer per 100 parts by weight of polyvinyl chloride.

The invention is further illustrated by the following examples. In these examples, all parts are parts by weight, and all percentages are percentages by weight.

EXAMPLE 1

To a mixture of 306.6 parts (2.0 moles) of phosphorus oxychloride and 2.0 parts (0.02 mole) of anhydrous magnesium chloride which had been heated to 45°C. was added 871 parts (4.0 moles) of 2,3-dibromopropanol over a period of three hours during which the temperature was maintained at 45°–50°C. by external cooling. Then 304 parts (2.2 moles) of phenoxyethanol was added over a period of 2 hours at the same temperature. The reaction mixture was stirred and heated at 80°C./30 mm Hg for eight hours. To the reaction mixture, which had an acid number of 15, was added 50 parts (0.54 mole) of epichlorohydrin, and the mixture was heated at 80°C. for an additional 3 hours. The resulting mixture, which had an acid number of 3, was washed with 200 parts of a 1% sodium carbonate solution at 75°–80°C. and then four 200 part portions of water at 75°–80°C. After drying at 90°C./30 mm Hg and filtering, there was obtained 831 parts of phenoxyethyl bis(2,3-dibromopropyl) phosphate which contained 4.93% P and 49.8% Br (calculated for $C_{14}H_{19}O_5Br_4P$, 5.01% P and 51.7% Br) and which had an $n_D^{25}$ of 1.5615 and an acid number of 0.11. The yield of phenoxyethyl bis(2,3-dibromopropyl) phosphate was 67%, based on $POCl_3$.

EXAMPLE 2

To a mixture of 306.6 parts (2.0 moles) of phosphorus oxychloride and 2.0 parts (0.02 mole) of anhydrous magnesium chloride which had been heated to 45°C. was added 435.8 parts (2.0 moles) of 2,3-dibromopropanol over a period of two hours during which the temperature was maintained at 45°–50°C. by external cooling. Then 566.6 parts (4.1 moles) of phenoxyethanol was added over a period of 3 hours at the same temperature. The reaction mixture was stirred and heated at 80°C./30 mm Hg for 6 hours. To the reaction mixture, which had an acid number of 18, was added 35 parts (0.378 mole) of epichlorohydrin, and the mixture was heated at 80°C. for an additional 2 hours at the end of which its acid number was 6.1. The reaction mixture was washed with two 200 part portions of a 10% sodium carbonate solution at 80°C. and then with two 200 part portions of water at 80°C. After it had been sparged with steam for 4 hours at 98°C./50 mm Hg, the reaction product was washed with 150 parts of a 5% sodium carbonate solution at 80°C., dried at 90°C./50 mm Hg, stirred for 15 minutes at 80°C. with 5 parts of filter-aid, and filtered. There was obtained 847 parts of bis(phenoxyethyl) (2,3-dibromopropyl) phosphate, which contained 5.30% P and 30.3% BR (calculated for $C_{19}H_{23}O_6Br_2P$: 5.75% P and 29.7% Br) and had an $n_D^{25}$ of 1.5516 and an acid number of 0.08. The yield of bis(phenoxyethyl) (2,3-dibromopropyl) phosphate was 79%, based on $POCl_3$.

EXAMPLE 3

To a mixture of 306.6 parts (2.0 moles) of phosphorus oxychloride and 0.8 part (0.02 mole) of anhydrous magnesium oxide which had been heated to 70°C. was added 370.0 parts (4.0 moles) of epichlorohydrin over a period of about three hours during which the temperature was maintained between 70° and 80°C. The reaction mixture was heated at a temperature between 70° and 80°C. for an additional 5 hours during which pressure was gradually reduced to 45 mm Hg. Then 290.2 parts (2.1 moles) of phenoxyethanol was added over a period of 2 hours while the mixture was maintained at 80°C./45 mm Hg. After an additional 2 hours heating under these conditions, the reaction product was washed with 200 parts of a 15% aqueous sodium carbonate solution at 80°C. for 10 minutes and then with two 200 part portions of water. The product was sparged with steam at 125°C./40 mm Hg. for three hours after which the sodium carbonate solution and water washes were repeated. It was then dried at 125°C./25 mm Hg, stirred for 10 minutes at 80°C. with 4.5 parts of filter-aid, and filtered. There was obtained 753 parts of phenoxyethyl bis(1,3-dichloropropyl) phosphate, which contained 7.2% P and 30.6% Cl (calculated for $C_{14}H_{19}O_5Cl_4P$, 7.04% P and 32.2% Cl) and which had an $n_D^{25}$ of 1.5214 and an acid number of 0.04. The yield was 85% based on $POCl_3$.

EXAMPLE 4

To a mixture of 306.6 parts (2.0 moles) of phosphorus oxychloride and 2.0 parts (0.0056 mole) of tetrabutyl titanate which had been heated to 80°C. was added 185 parts (2.0 moles) of epichlorohydrin over a period of about 3 hours during which the temperature was maintained at 50°–60°C. by external cooling. The reation mixture was heated at 50°C./40 mm Hg for 2 hours and then at 80°C./40 mm Hg for one hour. It was cooled to 25°–30°C. and washed with 200 parts of a 10% sodium carbonate solution and two 200 part portions of water, sparged with steam at 130°C./30 mm Hg for two hours, and then again washed with the sodium carbonate solution and with water. It was dried at 90°C./30 mm Hg, stirred for 10 minutes at this temperature with 6 parts of filter-aid, and filtered. There was obtained 652 parts of bis(phenoxyethyl) (1,3-dichloropropyl) phosphate, which contained 6.90% P and 15.9% Cl (calculated for $C_{19}H_{23}O_6Cl_2P$, 6.90% P and 15.8% Cl) and which had an $n_D^{25}$ of 1.5346 and an acid number of 0.07. The yield was 72% based on $POCl_3$.

EXAMPLE 5

A series of clear polyvinyl chloride compositions was prepared by the following procedure:

A mixture of 100 parts of polyvinyl chloride (relative viscosity of a 1% solution in cyclohexane - 2.00 to 2.08), 3 parts of barium/cadmium/zinc stabilizer (Nuostabe V-1397), 0.5 part of stearic acid, 5 parts of epoxidized soybean oil, 32.5 parts of dioctyl phthalate, and 12.5 parts of one of the products of Examples 1–4 or of tris(2,3-dibromopropyl) phosphate, a comparative flame-retardant plasticizer, was blended at room temperature and then charged to a 2-roll, steam-heated, differential-speed mill, whose roll-surface temperature was maintained at 340°F. The mixture was milled for 5 minutes and then removed from the mill as a flexible homogeneous sheet that was 0.045 inch thick. Samples cut from the sheets were press molded to obtain film specimens that were 1 × 1 × 0.07 inches in size.

The following standard test methods were used in the evaluation of the compositions:

| | |
|---|---|
| Flame Resistance as Limiting Oxygen Index (LOI) | ASTM D-2863 |
| Tensile Strength (psi) | ASTM D-638-68 |
| 100% Modulus (psi) | ASTM D-638-68 |
| Elongation (%) | ASTM D-638-68 |
| Hardness (Durometer A, 10 seconds) | ASTM D-2240-68 |
| Compatibility (spew) | — |
| Low Temperature Flexibility (45,000 psi) (°C.) | ASTM D-1043-69 |
| Oven Heat Stability at 350°F. (0–180 minutes) | — |

The compositions tested and their properties are set forth in the following table:

Evaluation of Phenoxyethyl Haloalkyl Phosphates as Plasticizers for PVC

| Phosphate Ester | Prod. Ex. 1 | Prod. Ex. 2 | Prod. Ex. 3 | Prod. Ex. 4 | Tris(2,3-dibromopropyl) phosphate | Isodecyl diphenyl phosphate at 25 PHR |
|---|---|---|---|---|---|---|
| Milling Properties | Good | Good | Good | Good | Good | Good |
| Sheet Stock Appearance | Good | Good | Good | Good | Good | Good |
| Flame Resistance (LOI)* | 26.0 | 24.7 | 26.2 | 25.1 | 27.0 | 25.9 |
| Tensile Strength (psi) | 2860 | 2850 | 2870 | 2920 | 3000 | 2780 |
| 100% Modulus (psi) | 1910 | 1620 | 1750 | 1810 | 2070 | 1450 |
| % Elongation | 340 | 390 | 390 | 350 | 350 | 390 |
| Hardness (Durometer A, 10 seconds) | 86 | 87 | 85 | 86 | 86 | 82 |
| Compatibility (Spew) | Good | Good | Good | Good | Good | Good |
| Low Temperature Flexibility (45,000 psi) (°C.) | −16 | −15 | −15 | −12 | −11 | −20 |
| Oven Stability at 350°F.** | | | | | | |
| 0 Minutes | 1 | 1 | 1 | 1 | 1 | 1 |
| 15 Minutes | 1 | 2 | 1 | 1 | 1 | 1 |
| 30 Minutes | 1 | 3 | 1 | 1 | 1 | 1 |
| 45 Minutes | 2 | 5 | 1 | 1 | 1 | 1 |
| 60 Minutes | 4 | 6 | 1 | 1 | 2 | 3 |
| 75 Minutes | — | 8 | 2 | 2 | — | 5 |
| 90 Minutes | 7 | 9 | 2 | 3 | 7 | 7 |
| 105 Minutes | — | 9 | 3 | 6 | — | 8 |
| 120 Minutes | 10 | 9 | 4 | 7 | 10 | 8 |
| 135 Minutes | — | 9 | 5 | 7 | — | 10 |
| 150 Minutes | — | 10 | 6 | 8 | — | — |
| 165 Minutes | — | — | 8 | 10 | — | — |

*A composition that contained 45 PHR of dioctyl phthalate as the sole plasticizer had an LOI value of 22.5
**Discoloration that occurred during heating is indicated by means of a scale of 1–10, with a rating of 1 indicating colorless and a rating of 10 indicating black.

From the data in the table, it will be seen that the compositions containing the products of Examples 1-4 showed excellent overall plasticizer properties including heat stability, low temperature flexibility, and flame resistance.

What is claimed is:

1. A phosphate ester that has the structural formula

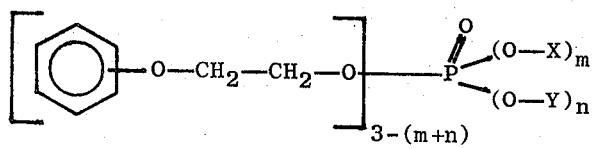

wherein X and Y each represents haloalkyl having 2 to 4 carbon atoms and at least 2 halogen atoms selected from the group consisting of bromine, chlorine, and mixtures thereof; and $m$ and $n$ each represents a number in the range of 0 to 2, the sum of $m$ and $n$ being 1 or 2.

2. A phosphate ester according to claim 1 that is a phenoxyethyl dihalopropyl phosphate.

3. A phosphate ester according to claim 2 that is phenoxyethyl bis(1,3-dichloropropyl) phosphate.

4. A phosphate ester according to claim 2 that is bis(phenoxyethyl) (1,3-dichloropropyl) phosphate.

5. A phosphate ester according to claim 2 that is phenoxyethyl bis(2,3-dibromopropyl) phosphate.

6. A phosphate ester according to claim 2 that is bis(phenoxyethyl) (2,3-dibromopropyl) phosphate.

* * * * *